United States Patent
Seehof

(10) Patent No.: US 11,322,040 B2
(45) Date of Patent: May 3, 2022

(54) PROCESS AND COMPUTER PROGRAM FOR CONTROLLING A SIMULATOR, AND SIMULATOR THEREFOR

(71) Applicant: DEUTSCHES ZENTRUM FUR LUFT-UND RAUMFAHRT E.V., Cologne (DE)

(72) Inventor: Carsten Seehof, Braunschweig (DE)

(73) Assignee: DEUTSCHES ZENTRUM FUR LUFT-UND RAUMFAHRT E.V., Cologne (DE)

(*) Notice: Subject to any disclaimer, the term of this patent is extended or adjusted under 35 U.S.C. 154(b) by 176 days.

(21) Appl. No.: 16/500,582

(22) PCT Filed: Mar. 28, 2018

(86) PCT No.: PCT/EP2018/057990
§ 371 (c)(1),
(2) Date: Oct. 3, 2019

(87) PCT Pub. No.: WO2018/184954
PCT Pub. Date: Oct. 11, 2018

(65) Prior Publication Data
US 2020/0202740 A1    Jun. 25, 2020

(30) Foreign Application Priority Data
Apr. 4, 2017 (DE) .................. 10 2017 107 220.9

(51) Int. Cl.
*G09B 17/00* (2006.01)
*G09B 9/12* (2006.01)

(52) U.S. Cl.
CPC ..................................... *G09B 9/12* (2013.01)

(58) Field of Classification Search
CPC ........................................................ G09B 9/12
USPC .......................................................... 434/55
See application file for complete search history.

(56) References Cited

FOREIGN PATENT DOCUMENTS

DE    10 2011 103736 A1    12/2012
DE    10 2015 102459 A1    8/2016

OTHER PUBLICATIONS

Stratulat et al: "Improving the realism in motion-based driving simulators by adapting tilt-translation technique to human perception", Virtual Reality Conference (VR), 2011, pp. 47-50, Sep. 3, 2011.
Casolo et al: "Functional mechanical design of a low cost driving simulator", Mechatronics and Its Applications, 2008, pp. 1-6, May 27, 2008.

*Primary Examiner* — Kesha Frisby
(74) *Attorney, Agent, or Firm* — WC&F IP

(57) ABSTRACT

The invention relates to a process for controlling a simulator, wherein acceleration forces along the vertical axis of the vehicle are to be simulated by tilting the simulator booth.

8 Claims, 2 Drawing Sheets

PROCESS AND COMPUTER PROGRAM FOR CONTROLLING A SIMULATOR, AND SIMULATOR THEREFOR

Figure 1:
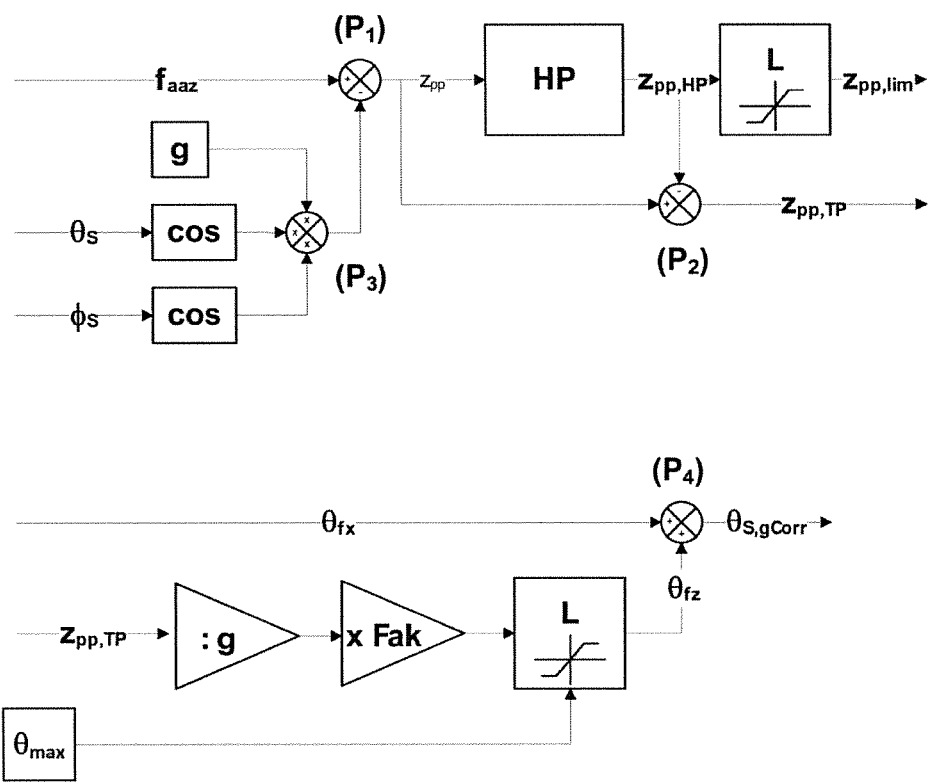

The invention relates to a method for controlling a simulator for simulating a translational and/or rotational motion behavior of a vehicle, wherein on the basis of a simulation model of the vehicle to be simulated the specific forces acting in the vehicle axes of the vehicle to be simulated are made available and transformed into control commands for controlling the simulator, in order to simulate the translational and/or rotational motion behavior by motion of a simulator cabin of the simulator. The invention relates equally to a computer program with program-code means for this purpose, and also to a simulator that has been set up in such a manner.

According to the current state of the art, motion systems of simulators are controlled via filters. The latter transform the specific forces, ascertained from the simulation model of the vehicle to be simulated, in the respective vehicle axes into control commands for the individual actuators, in order to control the motion system of the simulator and in this way to transform the specific forces into corresponding motions of the simulator cabin of the simulator. The specific forces that are ascertained from the simulation model of the vehicle to be simulated can in this case also be made available in the form of acceleration values which represent equivalents to the specific forces acting in the vehicle axes of the vehicle to be simulated.

By virtue of the translating of the specific forces, ascertained in the simulation model of the vehicle to be simulated, into motions of the simulator cabin of the simulator, motions of a vehicle in the real world can be simulated, so that the driver of the vehicle or of the simulator is given the feeling of actually piloting a vehicle through the real world. If the driver of the vehicle simulator now carries out piloting tasks such as, for instance, accelerating, decelerating or control inputs, these piloting inputs are translated into corresponding motions of the simulator which are made available from the simulation model as specific forces or accelerations. Since with the aid of an image-projection device an image of the external environment of the vehicle is displayed in the field of vision of the driver, said environment representing a feedback of the motion behavior from the simulation model via the visual channel, the immersive effect is intensified in this way.

This simulation approach provides that the motion values and/or acceleration values or forces acquired by the modulation of the vehicle in the simulation are mapped into the motion space of the motion system, the high-frequency components of the translational accelerations and also the high-frequency components of the rotational accelerations being re-enacted directly in the corresponding degrees of freedom of the simulator. The low-frequency components of the translational acceleration in the longitudinal axis and in the transverse axis, on the other hand, are represented by the tilting of the simulator cabin in relation to the perpendicular to the Earth (angle between the normal axis and the perpendicular to the Earth), as a result of which the apparent-weight vector in the cabin changes. Since the remaining attitude representations available to the user, such as external view or instruments, continue to describe the original attitude, the driver of the simulator gets the impression of a prolonged translational acceleration in the longitudinal axis or in the transverse axis, which is to be attributed to the acceleration due to gravity in the respective axis.

However, for a correct representation of the low-frequency translational acceleration by the tilting of the motion platform in relation to the perpendicular to the Earth, it has to be ensured that the rotation or inclination of the simulator cabin occurs below the perception threshold, so that only the change in the apparent-weight vector is perceived by the vehicle pilot in the simulator, but not the rotation of the simulator cabin itself. Otherwise a simulation error arises in the course of the cognitive processing by the vehicle pilot, which unpleasant and in the worst case can lead to so-called simulator sickness.

Besides the physiological perception threshold, a further limit of such a method consists, in principle, in the fact that this method is conceivable only for longitudinal (longitudinal axis) and lateral (transverse axis) states of acceleration, since only for these are corresponding rotational degrees of freedom available for adjusting an apparent-weight vector with the aid of the perpendicular to the Earth. In this way, longitudinal accelerations can be represented by a pitch attitude of the simulator cabin, lateral accelerations by a roll attitude of the simulator cabin. For load factors in the vertical direction (z-axis or normal axis), this method, known as tilt coordination, cannot be adopted, since a load factor exceeding the weight resulting from the perpendicular to the Earth cannot be represented by a tilting of the simulator cabin. Accordingly, accelerations in the vertical axis of the vehicle (z-axis, normal axis) can only be reproduced by translational accelerations of the simulator cabin, as a result of which such load factors are limited to high-frequency components. Low-frequency, prolonged accelerations in the vertical axis of the vehicle, however, cannot be represented by the methods known from the prior art.

Especially in the case of a coordinated curvilinear flight or in a flare-out, however, in consequence of the additional centrifugal forces specific forces arise in the vertical axis of the vehicle, which cannot be represented by a translational motion of the simulator cabin for the purpose of representing the acceleration forces, since these acceleration forces are of low-frequency type. These load factors in the normal axis of the vehicle, which result from such a curvilinear flight or flare-out, consequently cannot be reproduced in the simulator cabin at present with the aid of a simulator.

It is therefore an object of the present invention to make available an improved method, a computer program and also a simulator with which load factors, in particular of low-frequency type, in the vertical axis of the vehicle can be simulated for the vehicle pilot in the simulator cabin.

In accordance with the invention the object is achieved with the method as claimed in claim 1, with the computer program as claimed in claim 7, and with the simulator as claimed in claim 8.

According to claim 1, a method is proposed for controlling a simulator for simulating a translational and/or rotational motion behavior of a vehicle, wherein on the basis of a simulation model of the vehicle to be simulated the specific forces or accelerations acting in the vehicle axes of the vehicle to be simulated are made available and transformed into control commands for controlling the simulator, in order to simulate the translational and/or rotational motion behavior by motion of a simulator cabin of the simulator.

In order to be able to reproduce the specific forces or accelerations acting in the direction of the normal axis of the vehicle with the aid of the method according to the invention, first of all the specific forces or accelerations in the vertical axis of the vehicle originating from the simulation model of the vehicle to be simulated are made available, which are to be simulated by the simulator as translational accelerations in the vertical axis of the vehicle. These load factors in the vertical axis of the vehicle originate from the simulation model in the course of the simulation of the motion behavior of the vehicle, and arise, for instance, in the case of a coordinated curvilinear flight or a flare-out, in the course of which the pilot would be freed from forces in the longitudinal and lateral directions and, by reason of the centrifugal forces, would perceive merely load factors in the normal axis of the vehicle.

Subsequently a pitch-attitude angle of the simulator cabin between the horizontal plane and the longitudinal axis of the simulator cabin is calculated as a function of the force or acceleration made available, said pitch-attitude angle being adjustable by a rotation of the simulator cabin about the transverse axis of the simulator cabin. A pitch-attitude angle between the horizontal plane (or horizon) and the longitudinal axis of the simulator cabin in this case also leads to an angular offset between perpendicular to the Earth and normal axis (z-axis) of the simulator cabin.

On the basis of this, rotational control commands for controlling the simulator are generated as a function of the calculated pitch-attitude angle of the simulator cabin, and the simulator is then controlled on the basis of the generated rotational control commands, in order to simulate the translational force acting in the vertical axis of the vehicle by the pitch-attitude angle.

In accordance with the invention, load factors in the normal axis of the vehicle are accordingly simulated by adjusting a pitch attitude or a pitch-attitude angle of the vehicle, by the vehicle cabin being rotated about the transverse axis on the basis of the load factor, as a result of which the pitch-attitude angle is adjusted.

The inventor has recognized that such a load factor in the normal axis of the vehicle can therefore be simulated by a pitch-attitude angle of the simulator cabin, since by reason of the changing seat position the vehicle pilot is given the feeling that a load factor in the normal axis is acting on him/her, even if this is really not the case. This recognition is based on the analysis of the seat position of the vehicle pilot in a vehicle, and on the effect, resulting therefrom, of prolonged vertical load factors on the body. During unaccelerated rectilinear flight, for instance, by the influence of gravitational force a pilot is conscious of a pressure both on the seat face and in consequence of the inclination of the seat back. Since the inclination of the seat back is normally slight, the component of the acceleration force due to gravity that acts in the direction of view and perpendicular to the seat back is also slight. On the other hand, the force component acting parallel to the seat back is almost imperceptible, since the majority of the forces acting vertically are absorbed via the seat face. Additionally, a certain habituation to this component of the force in the direction of the normal axis of the body occurs.

If the vertical perceptible force is increased in consequence of a load factor, on the one hand the pressure on the seat face increases, and on the other hand the pressure on the back-rest in the direction of view increases. Whereas the increase in the pressure on the seat face is not perceived especially, by reason of habituation, the increasing pressure on the back-rest is very perceptible. The present invention takes advantage of this fact. By virtue of the tilting of the simulator cabin about the transverse axis and the adjusting of a pitch attitude, the pressure on the seat back is likewise increased. Although, in principle, this happens at the expense of the pressure on the seat face, by reason of habituation this is not perceived so strongly as the pressure in the back. The additional pressure on the seat back by reason of the inclination of the simulator cabin, however, is perceived more strongly by reason of the absence of habituation, so that the feeling arises that a load factor is acting on the pilot in the normal axis. By virtue of the representation of the external circumstances within the simulator cabin with the aid of an image-projection unit, furthermore the pilot is given a presentation visually that the maneuver being performed would lead to load factors in the normal axis, as a result of which the inclination of the simulator cabin and the pressure, resulting therefrom, on the back-rest is perceived and interpreted as precisely this.

Consequently, by tilting of the simulator cabin and by corresponding representation of the instruments and display within the simulator cabin with respect to the state of motion of the vehicle and the external representation, corresponding load factors in the normal axis can be simulated for the vehicle pilot without translational motion of the simulator cabin in the normal axis.

Advantageously, a low-frequency component of the translational force or acceleration acting in the vertical axis of the vehicle is ascertained by means of a low-pass filter, and the pitch-attitude angle is then calculated as a function of the ascertained low-frequency component of the translational force or acceleration force acting in the vertical axis of the vehicle, so that, in particular, low-frequency translational accelerations or forces can be reproduced by a tilting of the simulator cabin.

In an advantageous embodiment, a rate of turn (angle of rotation per time) of the simulator cabin about the transverse axis of the simulator cabin for the purpose of adjusting the calculated pitch-attitude angle is calculated as a function of the calculated pitch-attitude angle, so that the simulator cabin can be rotated correspondingly about the transverse axis by generating rotational control commands on the basis of the calculated rate of turn.

Advantageously, in this case the rate of turn is limited to a value that lies below the physiological perception threshold, so that the rotation about the transverse axis of the simulator cabin is not perceived by the vehicle pilot of the simulator, and merely the increase in the force acting becomes perceptible. Therefore, in particular those low-frequency components of the force or acceleration to be simulated in the normal axis of the vehicle are suitable for the method which, by reason of the limitation of the rate of turn, can be adjusted below the physiological perception threshold. High-frequency components that only act for a short time can only be reproduced conditionally in the case of a limitation of the rate of turn below the physiological perception threshold.

Therefore it is advantageous if the rate of turn is limited to a value of less than or equal to 3° per second, in order that the rotation or the adjustment of the pitch attitude of the simulator cabin is not perceived by the vehicle pilot.

In an advantageous embodiment, with the aid of a high-pass filter the high-frequency components of the translational force acting in the vertical axis of the vehicle are ascertained, in the course of which these high-frequency components are simulated not by a rotation of the simulator cabin but by a translational motion of the simulator cabin in the normal axis. For this purpose, on the basis of the ascertained high-frequency components of the force or acceleration acting translationally corresponding control commands for controlling the simulator are generated, in order to accelerate the simulator cabin in the direction of the normal axis of the simulator cabin. The control commands for controlling the simulator are then utilized for the purpose of controlling the simulator, in order to simulate the translational force or acceleration acting in the vertical axis of the vehicle by the translational acceleration of the simulator cabin.

In this connection it is conceivable that by virtue of an appropriate filter or filter arrangement the signal is conducted both through a high-pass filter and through a low-pass filter. If the specific force acting in the normal axis has merely a high-frequency component, the result of the low-pass filter is zero, whereas the high-pass filter yields the corresponding high-frequency component. If the specific force or acceleration acting in the normal axis, which originates from the simulation model, has merely low-frequency components, the result of the high-pass filter is zero, whereas the low-pass filter yields the corresponding low-frequency component. In the former case, the simulator cabin would be accelerated merely in the normal axis of the simulator (within system boundaries), whereas in accordance with the invention in the second case the simulator cabin is rotated about the transverse axis in order to adjust the corresponding pitch-attitude angle.

It is also conceivable, however, that the specific force originating from the simulation model and acting in the normal axis of the vehicle has both a high-frequency and a low-frequency component, so that not only are control commands generated for a translational motion in the normal axis of the simulator cabin, in order to simulate the high-frequency components, but commands for adjusting the pitch attitude are also generated simultaneously, in order to reproduce the low-frequency components. By this means, in particular simulation errors can be avoided that arise by virtue of the fact that although, in conventional filter arrangements, the high-frequency components are reproduced by a translational acceleration, the low-frequency components are then no longer reproduced. The present invention closes this loophole by adjusting a pitch attitude, as a result of which the perception is generated within the simulator cabin that a load factor is acting in the normal axis.

Now if the value of the translational force, to be simulated, in the normal axis from the simulation model decreases slowly, for instance because no load factor in the normal axis is arising any longer in the simulation model, the simulator cabin is brought back into the horizontal attitude, and the pitch-attitude angle is set to zero. On the basis of the rate of back-rotation for the purpose of righting the simulator cabin, appropriate control commands are then generated, in order to control the simulator in such a way that the simulator cabin is rotated back again into the horizontal attitude. Of course, this preferentially likewise occurs below the physiological perception threshold.

Figure 2:
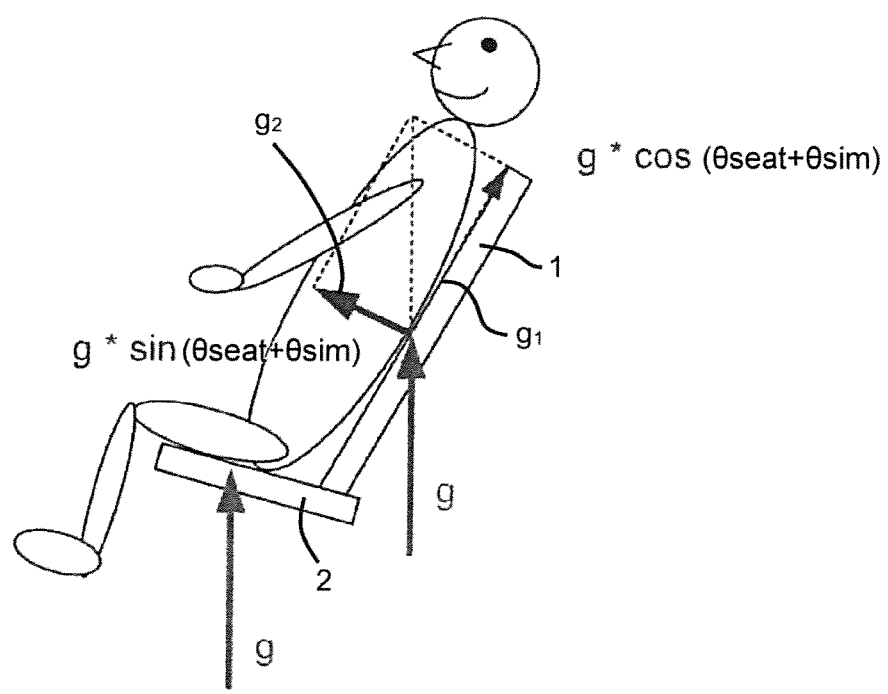

The invention will be elucidated in greater detail by way of an example with reference to the appended figures. Shown are:

FIG. 1 representation of a schematic filter arrangement for controlling the simulator;

FIG. 2 schematic representation of the principle of action.

FIG. 1 shows a filter arrangement, on the basis of which the values to be simulated can be ascertained and so, on the basis thereof, the control commands for controlling the simulator can be ascertained. By way of input signal, the filter receives the vertical acceleration in the normal axis of the vehicle as the translational force $f_{aax}$ acting in the vertical axis of the vehicle. However, since this acceleration includes the acceleration due to gravity, the latter has to be subtracted ($P_1$) within the coordinate system that is fixed with respect to the simulator in order to arrive at the actually desired acceleration of the cabin. The result is a load factor $Z_{pp}$ in the vertical normal axis of the vehicle.

This load factor $Z_{pp}$ in the normal axis of the vehicle is then conducted as input into a high-pass filter HP which may be, for instance, a third-order high-pass filter. The high-pass filter HP filters out the high-frequency components of the load factor $Z_{pp}$ and forwards this result $Z_{pp,HP}$ to a signal-limiter. The signal-limiter limits the result $Z_{pp,lim}$ to a value that can be represented for the simulator, so that here, in particular, the system boundaries of the simulator are taken into consideration.

The result of this filter which is known from the prior art is then used for the purpose of controlling the simulator, in order to move the simulator translationally in the normal axis and in this way to be able to simulate the high-frequency components of the translational acceleration in the normal axis.

In accordance with the invention, however, use is now made of the low-pass components of the input signal, in that the high-frequency component $Z_{pp,HP}$ is subtracted from the load factor $Z_{pp}$ (without component of acceleration due to gravity), this happening at point $P_2$. The result is the low-frequency component $Z_{pp,TP}$ of the load factor $Z_{pp}$, which in accordance with the invention is now processed further. The filter according to the invention for the low-frequency component of the vertical acceleration can be seen in the lower part of FIG. 1.

The lower part of FIG. 1 describes the determination of the definitive pitch-attitude angle of the simulator platform or of the simulator cabin ($\theta_{S,gCorr}$) as the sum (P4) of the pitch-attitude angle in consequence of a specific force in the longitudinal direction ($\theta_{\square x}$) and an additional pitch-attitude angle in consequence of the low-frequency component, described above, of the translational acceleration in the vertical direction ($\theta_{fz}$). The latter component is calculated from the low-frequency component of the acceleration of the cabin in the vertical direction ($z_{pp,TP}$). By means of division by the acceleration due to gravity g, this signal is converted into an equivalent angle. The subsequent multiplication by a factor Fak ensures the adjustability of this angle correction for application-specific boundary conditions. A further parameter is the maximally permissible pitch-attitude angle for this method ($\theta_{max}$), which restricts the additional pitch-attitude angle, found above, with the aid of the limiting function (L).

FIG. 2 shows the principle of action of the present invention on the basis of an example of a sitting person. In the example shown in FIG. 2, the simulator cabin has already been rotated about a pitch attitude. The acceleration due to gravity acts on the body in unchanged manner, but component $g_1$ is reduced in comparison with the normal, non-rotated seat position, whereas component $g_2$, which is perpendicular to the seat back 1, is increased in comparison with the normal, non-rotated position. This has the consequence that the pressure on the seat face 2 is reduced, whereas the pressure on the seat back 1 is increased.

By reason of habituation to the sitting position, the reduction in the force on the seat face 2 is perceived less strongly than the increase in the pressure on the seat back 1. Since, as a result, a load factor in the normal axis also leads to an increase in the pressure on the seat back, this being, as a rule, perceived more strongly than the increase in the pressure on the seat face 2, the pressure on the seat back 1 can be increased by a tilting of the seat position, this being perceived distinctly more strongly than the reduction on the seat face 1. This has the consequence that the impression arises that a vertical acceleration in the normal axis of the vehicle is acting on the simulator. Consequently, prolonged translational acceleration forces—such as arise, for instance, in the case of centrifugal forces in curvilinear flight—can be simulated.

The invention claimed is:

1. A method for controlling a simulator for simulating a translational and/or rotational motion behavior of a vehicle, wherein on a basis of a simulation model of the vehicle specific forces acting on vehicle axes of the vehicle are made available and transformed into control commands for controlling the simulator in order to simulate the translational and/or rotational motion behavior by motion of a simulator cabin of the simulator, comprising the following steps executed under control of a computing unit:

making available a translational force ($f_{aaz}$) acting in a vertical axis of the vehicle from the simulation model of the vehicle as a translational acceleration in the vertical axis of the vehicle, calculating a pitch-attitude angle of the simulator cabin between a horizontal plane and a longitudinal axis of the simulator cabin, wherein the pitch-attitude angle of the simulator cabin is adjustable by a rotation of the simulator cabin about a transverse axis of the simulator cabin as a function of the force made available, generating rotational control commands for controlling the simulator as a function of the calculated pitch-attitude angle of the simulator cabin, and controlling the simulator on a basis of the generated rotational control commands in order to simulate the translational force ($f_{aaz}$) acting in the vertical axis of the vehicle by the pitch-attitude angle.

2. The method as claimed in claim 1, wherein a low-frequency component ($Z_{pp,TP}$) of the translational force ($f_{aaz}$) acting in the vertical axis of the vehicle is ascertained using a low-pass filter, and the pitch-attitude angle is calculated as a function of the ascertained low-frequency component ($Z_{pp,TP}$) of the translational force ($f_{aaz}$) acting in the vertical axis of the vehicle.

3. The method as claimed in claim 1, wherein a high-frequency component ($Z_{pp,HP}$) of the translational force ($f_{aaz}$) acting in the vertical axis of the vehicle is ascertained using a high-pass filter (HP), and a vertical translational acceleration of the simulator cabin in the vertical axis of the vehicle is calculated as a function of the high-frequency component ($Z_{pp,HP}$) of the translational force ($f_{aaz}$) acting in the vertical axis of the vehicle, wherein control commands for controlling the simulator in the controlling step are generated as a function of the calculated vertical translational acceleration of the simulator cabin, and the simulator is controlled on the basis of the calculated control commands in order to simulate the translational force ($f_{aaz}$) acting in the vertical axis of the vehicle by the translational acceleration of the simulator cabin.

4. The method as claimed in claim 1 wherein a rate of turn of the simulator cabin about the transverse axis of the simulator cabin for the purpose of adjusting the calculated pitch-attitude angle is calculated as a function of the calculated pitch-attitude angle, and rotational control commands are generated as a function of the calculated rate of turn.

5. The method as claimed in claim 4, wherein the rate of turn is limited to a value that lies below a physiological perception threshold.

6. The method as claimed in claim 4 wherein the rate of turn is limited to a value of less than or equal to 3° per second.

7. A computer program with program-code encoded on a non-transient storage memory and which is set up for carrying out the method as claimed in claim 1 when the computer program is executed on a computing machine.

8. A simulator for simulating translational and rotational motions of a vehicle, comprising:

a simulator cabin which is moveable in relation to a fixed reference plane by actuators, and a control device that has been set up for carrying out the method as claimed in claim 1 for controlling the simulator.

* * * * *